(12) United States Patent
Tsunooka et al.

(10) Patent No.: US 7,363,889 B2
(45) Date of Patent: Apr. 29, 2008

(54) CONTROL DEVICE FOR MULTICYLINDER INTERNAL COMBUSTION ENGINE

(75) Inventors: Takashi Tsunooka, Susono (JP); Keizo Hiraku, Aichi (JP); Yukihiro Nakasaka, Susono (JP); Akira Hashizume, Yokohama (JP); Hiroshi Kanai, Susono (JP); Naohide Fuwa, Toyota (JP); Tomoyuki Kaga, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 10/521,556

(22) PCT Filed: Apr. 28, 2004

(86) PCT No.: PCT/JP2004/006202

§ 371 (c)(1),
(2), (4) Date: Jan. 23, 2006

(87) PCT Pub. No.: WO2004/104394

PCT Pub. Date: Dec. 2, 2004

(65) Prior Publication Data

US 2006/0150936 A1 Jul. 13, 2006

(30) Foreign Application Priority Data

May 23, 2003 (JP) ............................. 2003-146101
Dec. 16, 2003 (JP) ............................. 2003-418590

(51) Int. Cl.
*F01L 1/34* (2006.01)

(52) U.S. Cl. ................. 123/90.15; 123/90.17; 123/346

(58) Field of Classification Search ............. 123/90.15, 123/90.16, 90.17, 90.18, 345, 346, 347, 348, 123/90.27, 90.31
See application file for complete search history.

(56) References Cited

U.S. PATENT DOCUMENTS

| 6,390,041 B2 | 5/2002 | Nakamura et al. |
| 2001/0003973 A1 | 6/2001 | Nakamura et al. |
| 2002/0104520 A1 | 8/2002 | Nakasaka et al. |

FOREIGN PATENT DOCUMENTS

| EP | 0 643 201 | 3/1995 |
| EP | 0 881 363 | 12/1998 |
| JP | 2001-152889 | 6/2001 |
| JP | 2001-173469 | 6/2001 |
| JP | 2002-155779 | 5/2002 |
| JP | 2002-213263 | 7/2002 |
| JP | 2002-303187 | 10/2002 |
| JP | 2004-332640 | 11/2004 |

OTHER PUBLICATIONS

Japanese Language Version of Japanese Office Action for Appln. No. JP 2003-418590 issued Jul. 10, 2006.
Japanese Language Translation of Japanese Office Action for Appln. No. JP 2003-418590 issued Jul. 10, 2006.
Patent Abstracts of Japan, vol. 1998, No. 11, Sep. 30, 1998 & JP 10 148141 A (Toyota Motor Corp), Jun. 2, 1998.

*Primary Examiner*—Ching Chang
(74) *Attorney, Agent, or Firm*—Kenyon & Kenyon LLP

(57) ABSTRACT

A control device of a multicylinder internal combustion engine provided with a valve operating characteristic control means for controlling a valve operating characteristic of at least one of an intake valve and exhaust valve, which estimates an intake difference of cylinders and limits a control range of said valve operating characteristic in accordance with said estimated intake difference.

11 Claims, 12 Drawing Sheets ns provided# CONTROL DEVICE FOR MULTICYLINDER INTERNAL COMBUSTION ENGINE

This is a 371 national phase application of PCT/JP2004/006202 filed 28 Apr. 2004, claiming priority to Japanese Application No. 2003-146101 filed 23 May 2003, and JP 2003-418590 filed 16 Dec. 2003, the contents of which are incorporated herein by reference.

TECHNICAL FIELD

The present invention relates to a control device for a multicylinder internal combustion engine.

BACKGROUND ART

In recent years, internal combustion engines provided with devices for controlling the operating angles, valve lifts, and other valve operating characteristics of the intake valves and exhaust valves in addition to the throttle valves and controlling the valve operating characteristics along with the throttle valve opening degrees so as to control the amounts of air taken into the combustion chambers (hereinafter "intakes") have been developed and become known.

On the other hand, in the past, in multicylinder internal combustion engines, due to assembly tolerances and mechanical tolerances of the valve parts or wear or deposits of the valve parts, variations arise in the intakes of the cylinders resulting in the problems of torque fluctuations and deteriorated exhaust emissions. Such problems similarly occur sometimes even in multicylinder internal combustion engines of types controlling the valve operating characteristics to control the intakes. It has been learned that in the case of the same intake pressure, the effect becomes greater the less the intake caused by the valve operating characteristics, that is, the smaller the operating angle or valve lift of an intake valve.

More specifically, assuming for example the same amount of deposit sticking to an intake valve, with respect to the same target intake, the deviation of the actual intake from the target intake becomes greater in the case of intake reducing the operating angle or valve lift compared with the case of intake increasing the operating angle or valve lift. As a result, the effect on the torque fluctuation etc. becomes greater the smaller the operating angle or the valve lift.

To deal with this problem, Japanese Unexamined Patent Publication (Kokai) No. 2002-303187 discloses a multicylinder internal combustion engine of the type controlling the valve operating characteristics to control the intake wherein the torque difference of cylinders is found and the fuel injection amount or ignition timing for each cylinder is corrected so as to reduce the torque difference of the cylinders. Further, this publication discloses to set the correction amount of the fuel injection amount etc. larger the smaller the operating angle of an intake valve so as to deal with the fact that the deviation between the actual intake and the target intake becomes greater the smaller the operating angle of an intake valve.

Further, Japanese Unexamined Patent Publication (Kokai) No. 2001-173469 discloses a variable valve device of an internal combustion engine provided with an actuation mechanism able to change the valve lift wherein since the intake difference of cylinders appears remarkably in a region where the valve lift is extremely small (superlow lift control region), this superlow lift control region is not used.

DISCLOSURE OF THE INVENTION

However, if the fuel injection amount or the injection timing is controlled to reduce the torque difference of cylinders like in the above first publication, deterioration of the exhaust emission may be incurred. In particular, in an operating region where the operating angle and/or lift become small, there is the problem that the exhaust emission easily deteriorates.

Further, if ending up not using the region with the small valve lift unconditionally like in the above second publication, the above region will not be used even if the intake difference of cylinders becomes sufficiently small even if the valve lift is made smaller due to the operating conditions (engine speed etc.) or operating environment (temperature, air pressure, etc.) and the effect of control of the valve lift to control the intake (for example, improvement of the fuel efficiency) may end up being meaninglessly reduced.

The present invention was made in consideration of the above problems and has as its object to provide a control device in a multicylinder internal combustion engine able to change a valve operating characteristic of an intake valve and/or exhaust valve which does not invite deterioration of the exhaust emission, can maintain as much as possible the effect due to control of the valve operating characteristic to control the intake, and can suppress torque fluctuation occurring due to the intake difference of cylinders.

The present invention provides as means for solving the problem the control device of a multicylinder internal combustion engine set forth in the claims.

A first aspect of the invention provides a control device of a multicylinder internal combustion engine provided with a valve operating characteristic control means for controlling a valve operating characteristic of at least one of an intake valve and an exhaust valve, which estimates an intake difference of cylinders and limits a control range of the valve operating characteristic in accordance with the estimated intake difference.

As the method of reducing torque fluctuation occurring in a multicylinder internal combustion engine, the method of correcting the fuel injection amount or injection timing for each cylinder may be considered, but with this method, there is a possibility of the exhaust emission deteriorating. On the other hand, the torque difference of cylinders causing torque fluctuation in a multicylinder internal combustion engine generally occurs due to the intake difference of cylinders. Further, the intake difference is also affected by the valve operating characteristics in addition to the engine speed. That is, there are valve operating characteristics liable to cause an intake difference of cylinders and valve operating characteristics not liable to cause it. Therefore, if limiting the control range of a valve operating characteristic to a range of the valve operating characteristic relatively not liable to cause an intake difference of cylinders, it is possible to reduce the torque fluctuation occurring due to the intake difference of cylinders. However, in this case, if limiting and making smaller the control range of the valve operating characteristic, sometimes the effect due to controlling the valve operating characteristic so as to control the intake (for example, improvement of the fuel efficiency) ends up being reduced.

In the first aspect of the invention, the limit on the control range of a valve operating characteristic is determined in accordance with the estimated intake difference of cylinders, so it is possible to limit the control range of the valve operating characteristic in accordance with the actually occurring intake difference of cylinders, that is, the extent of the torque fluctuation and exhaust emission due to the same. Due to this, no deterioration of the exhaust emission is invited, the effect due to the control of the valve operating characteristic to control the intake can be maintained as much as possible, and torque fluctuation due to the intake difference of cylinders can be suppressed. Further, since the intake difference of cylinders is reduced, improvement of the exhaust emission can also be achieved.

Note that here limiting the control range of the valve operating characteristic in accordance with the estimated intake difference of cylinders is considered to also include the case that the control range is not limited when the intake difference is less than a predetermined intake difference and the control range is limited when the intake difference becomes not less than the predetermined intake difference. Further, the "valve operating characteristic" in the present description means one or both of the operating angle and valve lift.

In a second aspect of the invention, there is provided the first aspect of the invention which limits said control range of the valve operating characteristic considering the engine speed and valve operating characteristic at the time of estimation of the intake difference in addition to the estimated intake difference.

As explained above, the intake difference of cylinders is affected by the engine speed and valve operating characteristics at that time. Therefore, if the engine speed or valve operating characteristic differs when estimating these even with the same intake difference, the significance of the intake difference (that is, the extent of the abnormality signified by the intake difference) differs.

In the second aspect of the invention, the limit on the control range of a valve operating characteristic is determined considering the estimated intake difference and the engine speed and valve operating characteristic when estimating the intake difference, so it is possible to accurately reflect the significance of the intake difference (that is, the extent of abnormality signified by the intake difference) to determine the limit of the control range regardless of the engines speed or valve operating characteristic when estimating the intake difference. That is, according to the second aspect of the invention, it is possible to estimate the intake difference to determine the limit on the control range at any engine speed and any valve operating characteristic.

Further, in the second aspect of the invention as well, it is possible to limit the control range of a valve operating characteristic in accordance with the actually occurring intake difference of cylinders, that is, the extent of torque fluctuation and exhaust emission due to the same. Due to this, no deterioration of the exhaust emission is invited, the effect due to the control of the valve operating characteristic to control the intake can be maintained as much as possible, and torque fluctuation due to the intake difference of cylinders can be suppressed. Further, reduction of the deterioration of the exhaust emission due to the intake difference of cylinders can also be achieved.

In a third aspect of the invention, there is provided the first or second aspect of the invention which controls an operating angle as said valve operating characteristic and sets a lower limit of control range of the operating angle larger the larger the operating angle at the time of estimating the intake difference. That is, it sets a lower limit of the subsequent control of the operating angle larger the larger the operating angle when estimating the intake difference in the case where the same intake difference is estimated.

When controlling the operating angle as the valve operating characteristic, the smaller the operating angle, the more easily an intake difference of cylinders occurs. Therefore, by using the third aspect of the invention, the limit on the control range of the valve operating characteristic can be suitably determined to keep the intake difference of cylinders within the allowable range. Due to this, no deterioration of the exhaust emission is invited, the effect due to the control of the valve operating characteristic to control the intake can be maintained as much as possible, and torque fluctuation due to the intake difference of cylinders can be suppressed. Further, reduction of the deterioration of the exhaust emission due to the intake difference of cylinders can be achieved.

In a fourth aspect of the invention, there is provided any of the first or second aspects of the invention which controls a valve lift as said valve operating characteristic and sets a lower limit of control range of the valve lift larger the larger the valve lift at the time of estimating the intake difference. That is, it sets a lower limit of the subsequent control of the valve lift larger the larger the valve lift when estimating the intake difference in the case where the same intake difference is estimated.

When controlling the valve lift as the valve operating characteristic, the smaller the valve lift, the more easily an intake difference of cylinders occurs. Therefore, by using the fourth aspect of the invention, the limit on the control range of the valve operating characteristic can be suitably determined to make the intake difference of cylinders within the allowable range. Due to this, no deterioration of the exhaust emission is invited, the effect due to the control of the valve operating characteristic to control the intake can be maintained as much as possible, and torque fluctuation due to the intake difference of cylinders can be suppressed. Further, reduction of the deterioration of the exhaust emission due to the intake difference of cylinders can be achieved.

In a fifth aspect of the invention, there is provided any of the first or second aspects of the invention which controls an operating angle and/or valve lift as said valve operating characteristic and sets a lower limit of control range of the operating angle and/or valve lift larger the larger the intake difference estimated.

In the fifth aspect of the invention as well, actions and effects substantially the same as in the third aspect or fourth aspect of the invention can be obtained.

In a sixth aspect of the invention, there is provided the first or second aspect of the invention which controls an operating angle and/or valve lift as said valve operating characteristic, limits a control range of the valve operating characteristic by correcting a target operating angle and/or target valve lift to become larger by exactly a predetermined correction amount when controlling the operating angle and/or valve lift, and sets said correction amount to become smaller the larger the target operating angle and/or target valve lift before correction.

When the operating angle and/or valve lift are relatively large, even if the intake difference is large, the effect of assembly tolerance or mechanical tolerance relating to the valve parts or wear or deposits of the valve parts becoming causes of intake difference can be deemed small.

Therefore, according to the sixth aspect of the invention, it is possible to keep from limiting the control range of the valve operating characteristic more than necessary and more suitably limit it. Further, due to this, no deterioration of the exhaust emission is invited, the effect due to the control of the valve operating characteristic to control the intake can be maintained as much as possible, and torque fluctuation due to the intake difference of cylinders can be suppressed.

Further, reduction of the deterioration of the exhaust emission due to the intake difference of cylinders can be achieved.

In a seventh aspect of the invention, there is provided the sixth aspect of the invention wherein said correction amount is set so as to become larger the larger the estimated intake difference.

According to the seventh aspect of the invention, it is possible to more suitably limit the control range of the valve operating characteristic and obtain actions and effects substantially the same as the sixth aspect of the invention.

In an eighth aspect of the invention, there is provided the first or second aspect of the invention which device is further provided with an operating timing changing means for changing an operating timing of at least one of the intake valve and exhaust valve, controls an operating angle and/or valve lift as said valve operating characteristic, limits a control range of the valve operating characteristic by correcting a target operating angle and/or target valve lift to become larger by exactly a predetermined correction amount when controlling the operating angle and/or valve lift, and changes the operating timing of at least one of the intake valve and exhaust valve so that a length of a period in which the intake valve and exhaust valve are both open in the case of the target operating angle and/or target valve lift after correction approaches or matches a length of a period in which the intake valve and exhaust valve are both open in the case of the target operating angle and/or target valve lift before correction.

If the length of the period during which the intake valve and exhaust valve are both open (valve overlap) becomes longer due to correction of the target operating angle and/or target valve lift to control the operating angle and/or valve lift, the amount of burnt gas remaining in the combustion chamber will increase, combustion will deteriorate, and worse torque fluctuation and misfires will occur in some cases.

As opposed to this, according to the eighth aspect of the invention, the operating timing of at least one of the intake valve and exhaust valve is changed so that the length of the valve overlap in the case of the target operating angle and/or target valve lift after correction approaches or matches the length of the valve overlap in the case of the target operating angle and/or target valve lift before correction. Further, due to this, it is possible to suppress worse torque fluctuation and misfires which might occur due to limiting the control range of the valve operating characteristics, that is, correction so as to make the target operating angle and/or target valve lift larger by exactly predetermined correction amounts when controlling the operating angle and/or valve lift.

In a ninth aspect of the invention, there is provided the eighth aspect of the invention which changes the operating timing of at least one of the intake valve and exhaust valve so that a timing of a period in which the intake valve and exhaust valve are both open in the case of the target operating angle and/or target valve lift after correction approaches or matches a timing of a period in which the intake valve and exhaust valve are both open in the case of the target operating angle and/or target valve lift before correction.

When the timing of the period during which the intake valve and exhaust valve are both open (valve overlap) changes due to correction of the target operating angle and/or target valve lift to control the operating angle and/or valve lift, the amount of burnt gas remaining in the combustion chamber will increase, combustion will deteriorate, and worse torque fluctuation and misfires will occur or conversely the amount of burnt gas remaining in the combustion chamber will decrease and the fuel efficiency will deteriorate in some cases.

As opposed to this, according to the ninth aspect of the invention, the operating timing of at least one of the intake valve and exhaust valve is changed so that the timing of the valve overlap in the case of the target operating angle and/or target valve lift after correction approaches or matches the timing of the valve overlap in the case of the target operating angle and/or target valve lift before correction. Further, due to this, it is possible to suppress the occurrence of trouble such as worse torque fluctuation which might occur due to limiting the control range of the valve operating characteristics, that is, correction so as to make the target operating angle and/or target valve lift larger by exactly predetermined correction amounts when controlling the operating angle and/or valve lift.

In a 10th aspect of the invention, there is provided the first or second aspect of the invention which device is further provided with an operating timing changing means for changing an operating timing of at least one of the intake valve and exhaust valve, controls an operating angle and/or valve lift as said valve operating characteristic, limits a control range of the valve operating characteristic by correcting a target operating angle and/or target valve lift to become larger by exactly a predetermined correction amount when controlling the operating angle and/or valve lift, and changes the operating timing of at least one of the intake valve and exhaust valve so that a length of a period in which the intake valve and exhaust valve are both open in the case of the target operating angle and/or target valve lift after correction becomes shorter than a length of a period in which the intake valve and exhaust valve are both open in the case of the target operating angle and/or target valve lift before correction.

If controlling the intake (fresh air taken into combustion chamber) by co-control of the valve operating characteristics of the operating angle and/or valve lift and the intake pressure, if correcting the target operating angle and/or target valve lift to become larger during control of the operating angle and/or valve lift, it is necessary to control the throttle valve to for example the closed side etc. to reduce the intake pressure so as to maintain the same target intake. If reducing the intake pressure in this way, due to this effect, the amount of the residual burnt gas is liable to increase even if the making the length of the period during which the intake valve and exhaust valve are both open (valve overlap) the same as the length before correction of the target operating angle and/or target valve lift. That is, the burnt gas more easily remains in the combustion chamber by exactly the drop of the intake pressure.

As opposed to this, according to the 10th aspect of the invention, the operating timing of at least one of the intake valve and exhaust valve is changed so that the length of the valve overlap in the case of the target operating angle and/or target valve lift after correction becomes shorter than the length of the valve overlap in the case of the target operating angle and/or target valve lift before correction. Further, due to this, it is possible to suppress an increase in the amount of residual burnt gas due to the drop in the intake pressure and thereby more reliably suppress trouble such as torque fluctuation which may occur due to limiting the control range of the valve operating characteristics while making the intake the target intake, that is, correction so as to make the target operating angle and/or target valve lift larger by exactly predetermined correction amounts when controlling the operating angle and/or valve lift.

In an 11th aspect of the invention, there is provided the 10th aspect of the invention wherein an extent of shortening the length of the period where the intake valve and exhaust valve are both open is set in accordance with a magnitude of change of intake pressure required for control of the intake due to correcting said target operating angle and/or target valve lift to control said operating angle and/or valve lift.

The extent by which the residual gas more easily remains in the combustion chamber may be considered to be determined in accordance with the magnitude of the change in intake pressure (drop in intake pressure) required for control of the intake due to correcting the target operating angle and/or target valve lift to control the operating angle and/or valve lift. Therefore, by using the 11th aspect of the invention, it is possible to make the amount of residual burnt gas in the case of controlling the operating angle and/or valve lift while correcting the target operating angle and/or target valve lift approach or match the amount of residual burnt gas in the case of controlling the operating angle and/or valve lift without correcting the target operating angle and/or target valve lift. Further, due to this, it is possible to more reliably suppress trouble such as torque fluctuation which may occur due to limiting the control range of the valve operating characteristics, that is, correction so as to make the target operating angle and/or target valve lift larger by exactly predetermined correction amounts when controlling the operating angle and/or valve lift and possible to suppress the occurrence of trouble such as the length of the valve overlap becoming shorter more than necessary and pump loss ending up increasing.

In a 12th aspect of the invention, there is provided the first or second aspect of the invention wherein the intake difference of cylinders is estimated based on the intake detected by an intake detecting means provided at an upstream side from an intake passage branching to an individual cylinder and wherein the intake detecting means detects the intake at the time of a valve operating characteristics by which the timings of opening of the intake valves of the plurality of cylinders do not overlap.

If detecting the intake by the intake detecting means at the time of a valve operating characteristic by which the timings of opening of the intake valves of the plurality of cylinders do not overlap as in the 12th aspect of the invention, it becomes possible to detect the intakes of the individual cylinders precisely even without providing intake detecting means at all intake passages branching to the individual cylinders. Further, due to this, it is possible to accurately estimate the intake difference, and therefore, by limiting the control range of the valve operating characteristics in accordance with the intake difference, the effects of the invention described in the claims can be sufficiently and reliably obtained.

In a 13th aspect of the invention, there is provided the 12th aspect of the invention wherein said intake detecting means includes an intake pressure sensor.

As the method for estimating the intake difference of cylinders, there are for example the method of estimation based on fluctuation of the engine speed, the method of estimation based on the change in air-fuel ratio, etc. However, the intake difference estimated by these methods includes the effects of the differences in fuel injection amounts of the individual cylinders, so even if limiting the control range of the valve operating characteristics in accordance with the intake difference obtained by these methods, there is a possibility that the effects of the invention set forth in the claims cannot be sufficiently obtained.

As opposed to this, in this aspect of the invention, since the intake difference of cylinders is estimated based on the intakes detected by the intake detecting means including intake pressure sensors, it is possible to obtain a more reliable intake difference eliminating the effects of the differences in fuel injection amounts of the individual cylinders. Accordingly, by limiting the control range of the valve operating characteristics in accordance with the intake difference, the effects of the invention described in the claims can be sufficiently and reliably obtained.

BRIEF DESCRIPTION OF THE DRAWINGS

The above and other features and advantages of the present invention will become more apparent from the following detailed description of the invention taken in conjunction with the accompanying drawings, wherein.

BEST MODE FOR CARRYING OUT THE INVENTION

Figure 1:
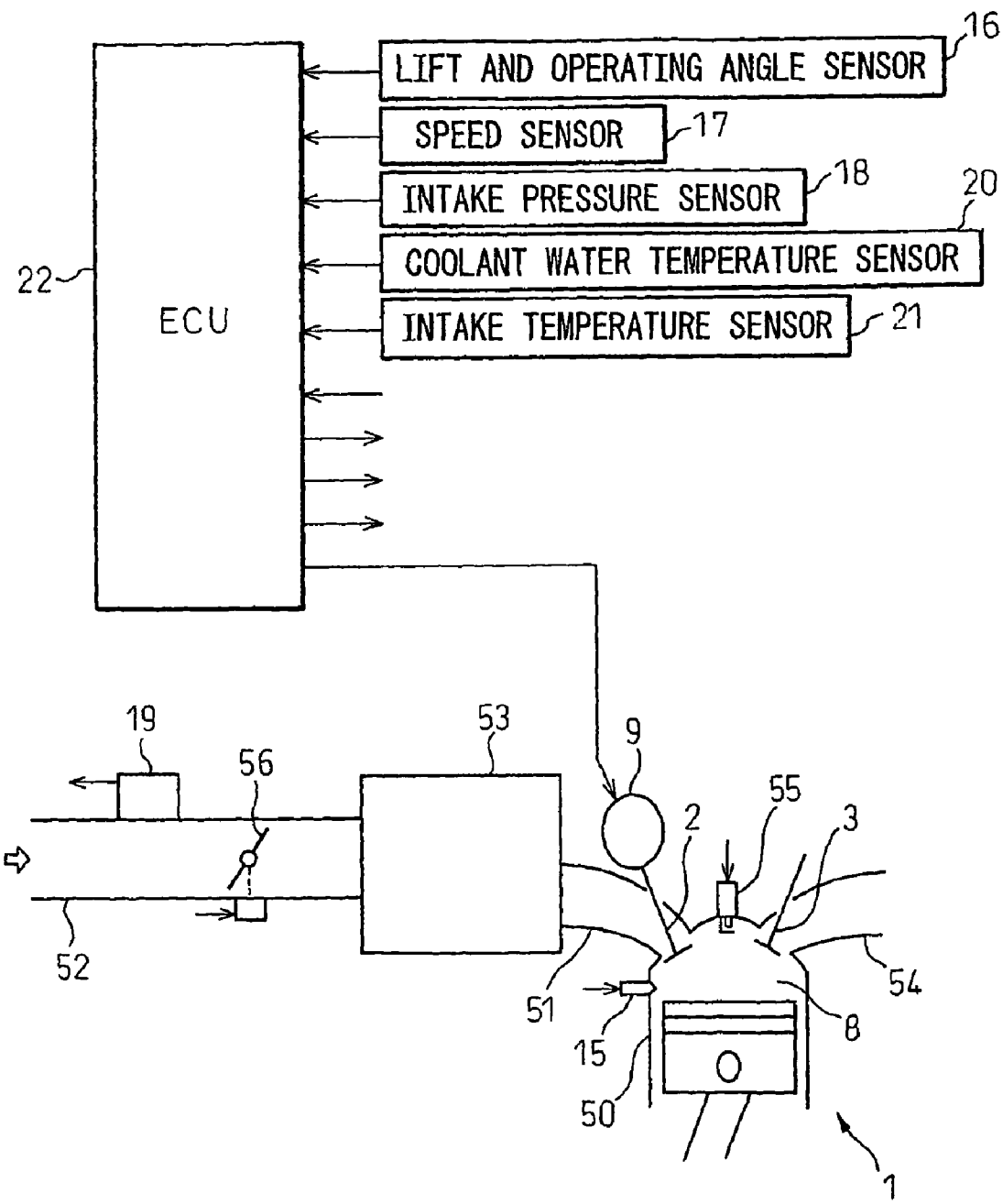
FIG. 1 is a view of the general configuration of an embodiment of a control device for an internal combustion engine according to the present invention.

Below, embodiments of the present invention will be explained in detail with reference to the drawings. In the drawings, the same or similar components are assigned common reference numerals.

Figure 2:
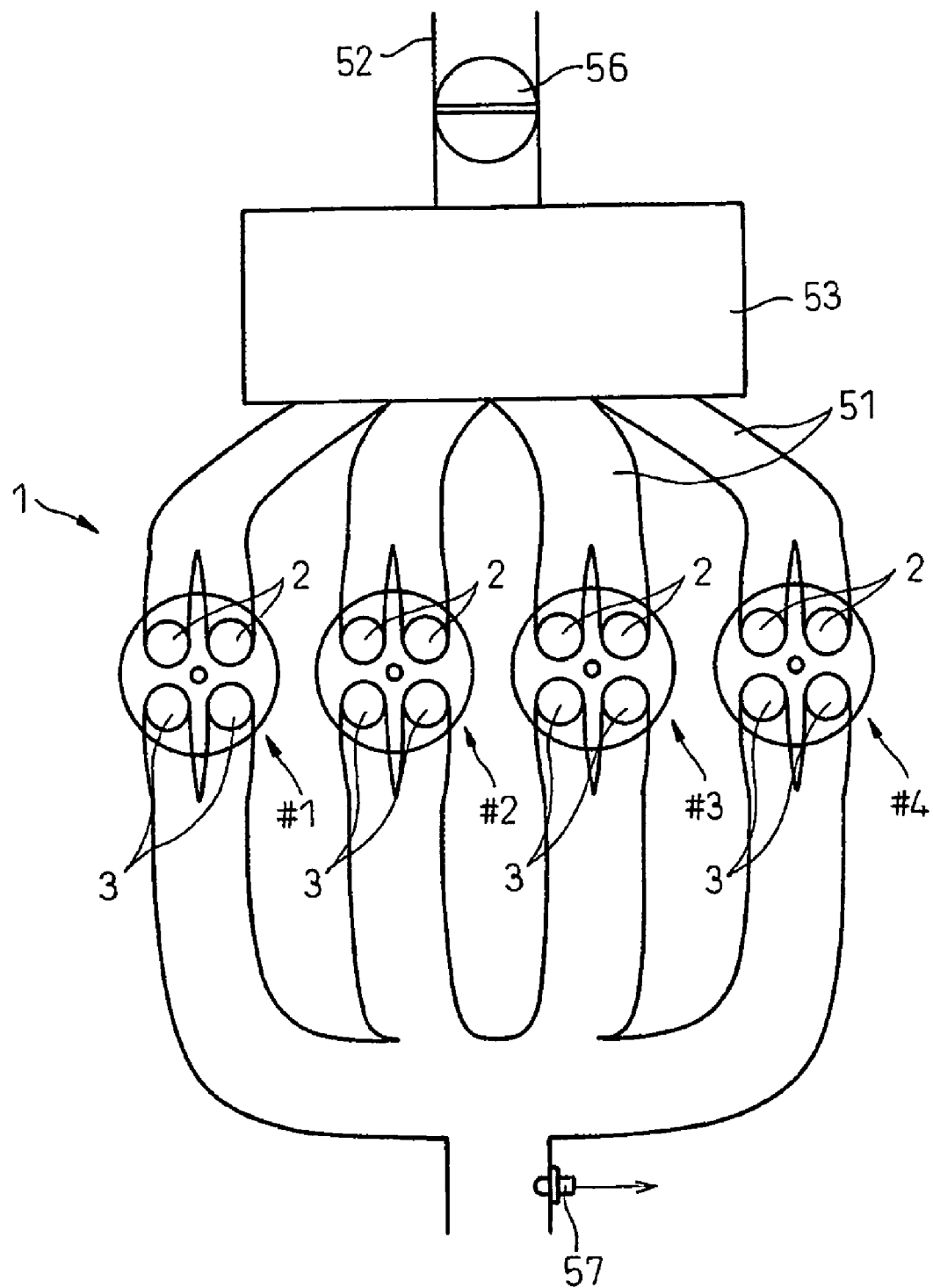
FIG. 2 is a plan view of an intake system etc. of a control device of an internal combustion engine shown in FIG. 1.

FIG. 1 is a view of the general configuration of an embodiment of a control device of an internal combustion engine of the present invention, while FIG. 2 is a plan view of an intake system etc. of a control device of an internal combustion engine shown in FIG. 1. In FIG. 1 and FIG. 2, reference numeral 1 is an internal combustion engine body, 2 is an intake valve, and 3 is an exhaust valve. As clear from FIG. 2, the internal combustion engine in this embodiment is a four-cylinder internal combustion engine. #1 to #4 in FIG. 2 show the first cylinder to the fourth cylinder.

In FIG. 1, reference numeral 8 is a combustion chamber formed in a cylinder, while 9 is a valve lift changing device for changing the valve lift. That is, by operating the valve lift changing device 9, it is possible to control the valve lift of an intake valve 2. In the present embodiment, when the valve lift changing device 9 changes the valve lift of an intake valve 2, the open area of the intake valve 2 is changed along with this. In an intake valve 2 of the present embodiment, the open area of the intake valve 2 increases along with an increase of the valve lift. Further, as explained later, in the present embodiment, if the valve lift of an intake valve 2 is changed by the valve lift changing device 9, the operating angle of the intake valve 2 will also be changed along with it.

Reference numeral 15 indicates a fuel injector, 16 is a sensor for detecting the valve lift and operating angle of the intake valve 2, and 17 is a sensor for detecting the engine speed. Reference numeral 18 indicates an intake pressure sensor for detecting the intake pressure, 19 is an air flow meter, 20 is a coolant water sensor for detecting the temperature of the engine coolant water, 21 is an intake temperature sensor for detecting the intake temperature, and 22 is an ECU (electronic control unit). Reference numeral 50 indicates a cylinder, 51 is a downstream side intake pipe forming an intake passage branching to an individual cylinder, 52 is an upstream side intake pipe, 53 is a surge tank, 54 is an exhaust pipe, 55 is a spark plug, 56 is a throttle valve, and 57 is an air-fuel ratio sensor for detecting an exhaust gas air-fuel ratio.

In the present embodiment, the fuel injector 15 is connected to the ECU 22. A signal from the ECU 22 may be used to control the amount of fuel injected or the injection timing. Similarly, the spark plug 55 is also connected to the ECU 22. A signal from the ECU 22 may be used to control the ignition timing. Further, the opening degree of the throttle valve 56 can be changed without regard as to the amount of depression of the accelerator pedal (hereinafter referred to as the "accelerator depression"). The intake pressure is controlled by adjusting the opening degree of the throttle valve.

Figure 3:
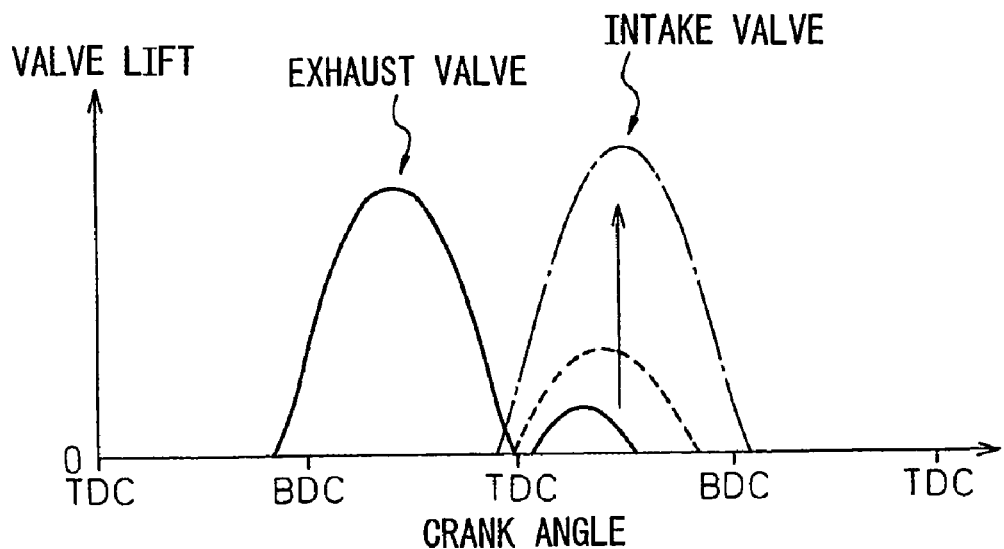
FIG. 3 is view of the state of change of the valve lift of an intake valve along with operation of a valve lift changing device.

FIG. 3 is a view of the state of change of the valve lift of the intake valve 2 along with operation of the valve lift changing device 9. As shown in FIG. 3, the valve lift of the intake valve 2 is continuously changed by the valve lift changing device 9. Further, in the present embodiment, the opening period of the intake valve 2 is also changed along with the operation of the valve lift changing device 9. That is, the operating angle of the intake valve 2 is also changed. More specifically, along with the increase in the valve lift of the intake valve 2, the operating angle of the intake valve 2 is increased (solid line→broken line→dotted line). Therefore, the valve lift changing device 9 can be used to control the valve lift and the operating angle. In the present embodiment, the valve lift changing device 9 forms a valve operating characteristic control means.

Further, in the present embodiment, along with operation of the valve lift changing device 9, the timing where the valve lift of the intake valve 2 peaks is also changed. More specifically, along with an increase of the valve lift of the intake valve 2, the timing where the valve lift of the intake valve 2 peaks is delayed (solid line→broken line→dotted line).

In this way, in the present embodiment, the valve operating characteristic control means constituted by the valve lift changing device 9 may be used to control the valve operating characteristics of the intake valve 2, while the throttle valve 56 may be used to control the intake pressure. Further, usually, the amount of air taken into the combustion chamber 8, that is, the intake, is controlled by co-control of the valve operating characteristics and intake pressure.

In a multicylinder internal combustion engine, however, assembly tolerance or mechanical tolerance relating to the valve parts or wear, deposits, etc. of the valve parts result in variations in the intake among the cylinders, whereby torque fluctuation occurs or the exhaust emission deteriorates. These problems similarly occur in multicylinder internal combustion engines of the type controlling the valve operating characteristics to control the intake as in the present embodiment in some cases. In particular, it has been learned that if the intake pressure is the same, the effect increases the smaller the intake due to the valve operating characteristics, that is, the smaller the operating angle or valve lift of the intake valve 2.

To deal with such a problem of torque fluctuation, the method of finding the torque fluctuation of cylinders and correcting the fuel injection amount or ignition timing of the individual cylinders to reduce the torque difference among the cylinders may also be considered, but when correcting the fuel injection amount or ignition timing to reduce the torque difference of cylinders, the exhaust emission may deteriorate. For example, when trying to suppress the torque fluctuation by just the fuel injection amounts, the air-fuel ratios of the individual cylinders become uneven, so the purification rate by the catalyst may fall. Further, when correcting the fuel injection amounts to make the air-fuel ratios of the cylinders uniform and then correcting the ignition timings to try to suppress torque fluctuation, the amount of unburnt HC exhausted may increase. These phenomena become remarkable in operating regions where the operating angles and lifts become small.

Therefore, in the present embodiment, consideration is given to the fact that the intake difference of cylinders is greatly affected by the valve operating characteristics, that is, the valve lift and the operating angle, and the following method is used to determine the limit on the control range of the valve lift and operating angle and easily and reliably reduce the torque fluctuation due to the torque difference of cylinders arising based on the intake difference of cylinders. Note that as clear from the above explanation, in the present embodiment, there is a certain relationship between the valve operating characteristics of the valve lift and operating angle, so in the following explanation of the method of determination of the limit on the control range, the explanation will be given using the valve lift as the valve operating characteristic.

Figure 4:
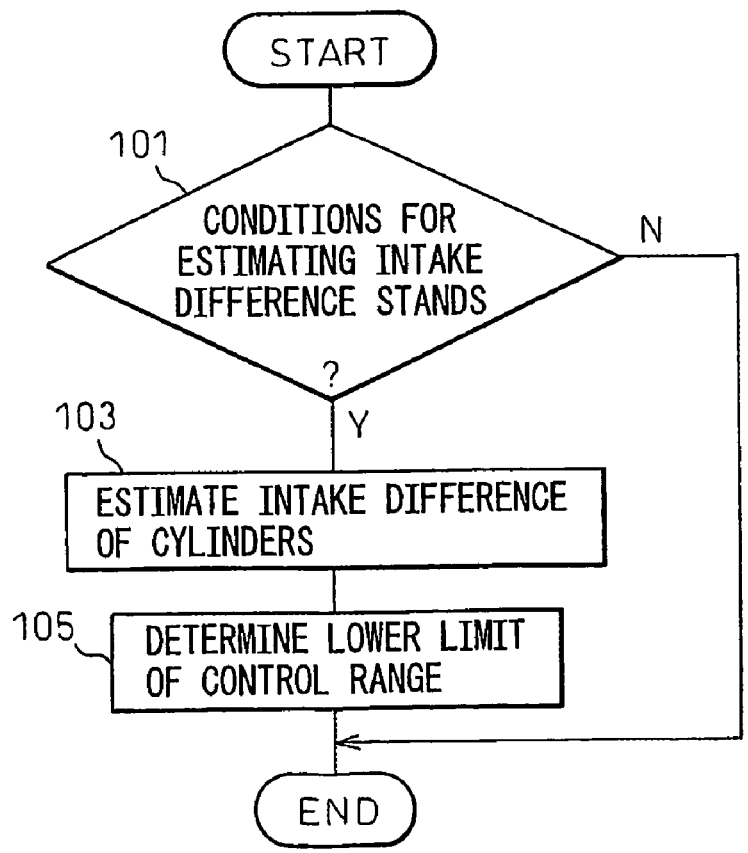
FIG. 4 is a flow chart of a method of determining a limit for a control range of a valve lift for reducing the torque fluctuation.

FIG. 4 is a flow chart of the control routine for working one of the methods for determining the limit on the control range of the valve lift. This control routine is executed by the ECU 22 by interruption every certain time interval. When this control routine starts, first, at step 101, it is judged if the condition for estimating the intake difference of cylinders stands. The condition stands when the internal combustion engine is operating by a predetermined engine speed and predetermined valve lift. When estimating the intake difference of cylinders, it is preferable that the engine be in the steady operating state where the engine speed and valve lift are constant, so the predetermined engine speed and predetermined valve lift can be made the engine speed and valve lift when the internal combustion engine is idling after warmup.

When it is judged at step 101 that the above condition does not stand, the control routine ends, while when it is judged that the condition stands, the routine proceeds to step 103. At step 103, the intake difference of cylinders is estimated. Various methods may be considered for estimating the intake difference of cylinders, but for example there are the method of estimation based on the fluctuation in the engine speed, the method of estimation based on changes in the air-fuel ratio, the method of estimation based on changes in the intake pressure, etc. Here, these methods will be explained simply.

First, there is the method of estimation based on the fluctuation in the engine speed. This uses the sensor 17 for detecting the engine speed. That is, in this embodiment, the sensor 17 is used to find the change over time of the engine speed, so it is possible to find fluctuation in the speed corresponding to detonation in the cylinders (#1 to #4) (e.g. difference between engine speeds just before ignition and engine speed after ignition at the individual cylinders) by analyzing this in relation to the crank angle. Further, it is possible to find the intake of the individual cylinders based on this and possible to find the intake difference of cylinders by calculating the difference between the maximum value and minimum value obtained for the individual cylinders.

Next, there is the method of estimation based on changes in the air-fuel ratio. This uses the air-fuel ratio sensor 57 for detecting the exhaust gas air-fuel ratio. That is, in the present embodiment, the air-fuel ratio 57 is used to find the changes over time of the exhaust gas air-fuel ratio, so it is possible to find the air-fuel ratios at the individual cylinders by analyzing these in relation to the crank angle. Further, it is possible to estimate the intake of the individual cylinders based on this and possible to find the intake difference of cylinders by calculating the difference between the maximum value and the minimum value in the intakes obtained for the individual cylinders.

Last, there is the method of estimation based on changes in the intake pressure. According to this method, it is considered possible to estimate the intake difference of cylinders more accurately than the above two methods. That is, with the method of estimation based on the fluctuation in the engine speed and the method of estimation based on changes in the air-fuel ratio, the estimated intake difference includes the effects of the difference in fuel injection amounts among the cylinders, but with the method of estimation based on changes in the intake pressure, the effect can be eliminated. Therefore, it is considered that a more accurate intake difference can be obtained.

The method of estimation based on changes in the intake pressure utilizes an intake pressure sensor 18 for detecting the intake pressure. That is, the intake pressure sensor 18 is provided at the downstream side intake pipe 51 forming the intake passage branched to an individual cylinder in order to detect the pressure in the downstream side intake pipe 51. In this case, it is possible to estimate the intake of the individual cylinder based on the change in the intake pressure (drop in intake pressure) found by the intake pressure sensor 18. It is possible to find the intake difference of cylinders by calculating the difference between the maximum value and minimum value in the intakes obtained for the cylinders.

Alternatively, it is also possible to have an intake pressure sensor 18 provided upstream from the downstream side intake pipes 51, for example, at the surge tank 53, and detect the pressure in the surge tank 53. In this case, since the intake pressure sensor 18 finds the change over time of the pressure in the surge tank 53, it is possible to find the changes in intake pressure corresponding to the individual cylinders (drop in pressure in the surge tank) by analyzing this in relation to the crank angle. Further, it is possible to estimate the intakes of the individual cylinders based on this and possible to find the intake difference of cylinders by calculating the difference between the maximum value and minimum value in the intakes obtained for the individual cylinders.

Note that in this case, it is preferable to detect the pressure in the surge tank by an intake pressure sensor 18 at the time of a valve operating characteristic (valve lift and operating angle) where the timings of opening of the intake valves of the plurality of cylinders do not overlap. This is for example when the operating angle is less than 180° in the case of a four-cylinder internal combustion engine. It is possible to establish accurate correspondence of the intake pressures detected by detection at this time with the individual cylinders and possible to more precisely estimate the intakes of the individual cylinders.

Further, for example, if finding the differences between the intakes of the individual cylinders estimated by the methods explained above and the standard intake determined by the operating state at that time, it is possible to find which cylinders has a greater intake and which cylinder has a smaller intake. Further, in the present embodiment, the intake difference of cylinders is found by calculating the difference between the maximum value and minimum value in the estimated intakes of the individual cylinders, but in other embodiments it is also possible to find another value representing the variation in intakes of cylinders based on the difference with the standard intake obtained in the above way and use it instead of the intake difference of cylinders.

After using any of the above methods to estimate the intake difference of cylinders, the routine proceeds to step 105, where the lower limit of the control range in the later valve lift control is determined in accordance with the intake difference estimated at step 103. The determination of the lower limit of the control range in the valve lift control uses the map shown in FIG. 5*a*. This map is prepared in advance for the above case of a predetermined engine speed and predetermined valve lift, but the lower limit of the valve lift is shown so that the intake difference of cylinders becomes within the allowable range of the intake difference corresponding to the allowable range of exhaust emission and torque fluctuation even under operating conditions other than the above predetermined engine speed and predetermined valve lift.

Figure 5A:
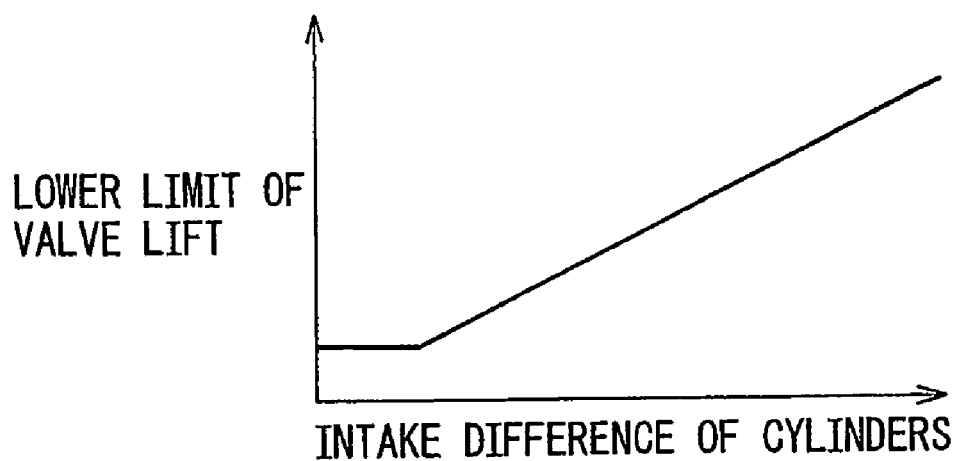
FIGS. 5a and 5b are maps for determining a lower limit of a control range of valve lift used in the method shown in the flow chart of FIG. 4.
Figure 5B:
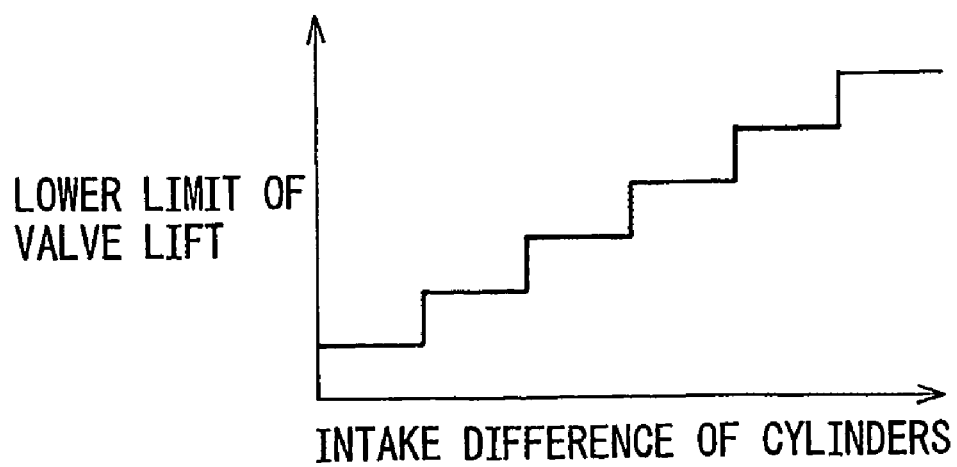

As shown in FIG. 5*a*, the lower limit of the valve lift tends to become larger the larger the intake difference of cylinders estimated at step 103. This is because the intake difference of cylinders occurs more easily the smaller the valve lift. By suitably preparing such a map, the limit on the control range of the valve lift for keeping the intake difference of cylinders within the allowable range can be suitably determined. Note that as the map for determining the lower limit of the valve lift, it is also possible to use a map designed so that the lower limit of the valve lift increases in steps along with an increase in the intake difference of cylinders estimated at step 103 as shown in FIG. 5b.

When the lower limit of the valve lift is determined at step 105, the control range of the valve lift is limited to be at least the lower limit in the subsequent control of the intake, but the total intake of all of the cylinders (that is, the intake of the internal combustion engine) can be controlled to the target intake by co-control with the control of the intake pressure by the throttle valve 56. That is, the intake realized by the valve lift becoming smaller than the above lower limit is realized by controlling the opening degree of the throttle valve 56 more to the closed side.

In this way, according to this method, it is possible to limit the control range of the valve lift in accordance with the actually occurring intake difference of cylinders, that is, the extent of torque fluctuation and exhaust emission occurring due to the same. Due to this, no deterioration of the exhaust emission is invited, the effect of control of the valve operating characteristics to control the intake can be maintained as much as possible, and torque fluctuation due to the intake difference of cylinders can be suppressed. Further, the intake difference of cylinders is reduced, so improvement of the exhaust emission can also be achieved.

Further, the method of reducing torque fluctuation by limiting the control range of the valve lift in this way is easier than the method of reducing the torque fluctuation by correcting the fuel injection amounts or ignition timings of the individual cylinders since it does not require identification of which cylinder exhibits excessive or insufficient torque to what degree. Further, it is reliable in that there is no miscorrection of the fuel injection amounts or ignition timings.

Figure 6:
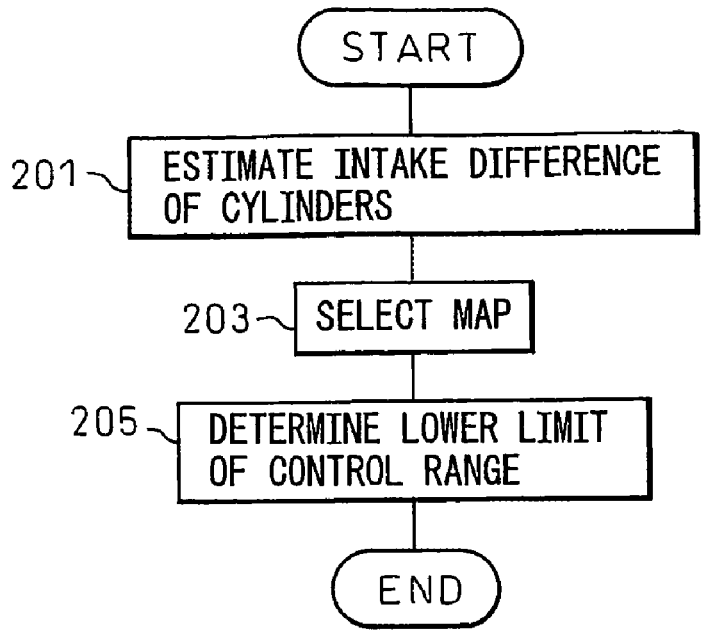
FIG. 6 is a flow chart of another method of determining a limit for a control range of a valve lift for reducing the torque fluctuation.

Next, another method of determination of the limit for the control range of the valve lift for reducing torque fluctuation and suppressing deterioration of the exhaust emission will be explained with reference to FIG. 6. FIG. 6 is a flow chart of the control routine for working this method. This control routine is executed by the ECU 22 by interruption every certain time interval. When this control routine starts, first, at step 201, the intake difference of cylinders is estimated at the engine speed and valve lift at that time. Here, the intake difference of cylinders is estimated by the method explained in relation to step 103 of the control routine of FIG. 4.

After the intake difference of cylinders is estimated at step 201, the routine proceeds to step 203, where the map for determining the lower limit of the valve lift is selected. Here, the map is selected based on the engine speed at the time of estimation of the intake difference of cylinders at step 201. This is because the intake difference of cylinders is affected by the engine speed, so even with the same intake difference, if the engine speed at the time of estimation differs, the significance of the intake difference (that is, the extent of abnormality indicated by the intake difference) will differ, so it is necessary to consider the engine speed when determining the lower limit of the valve lift from the intake difference of cylinders.

Figure 7:
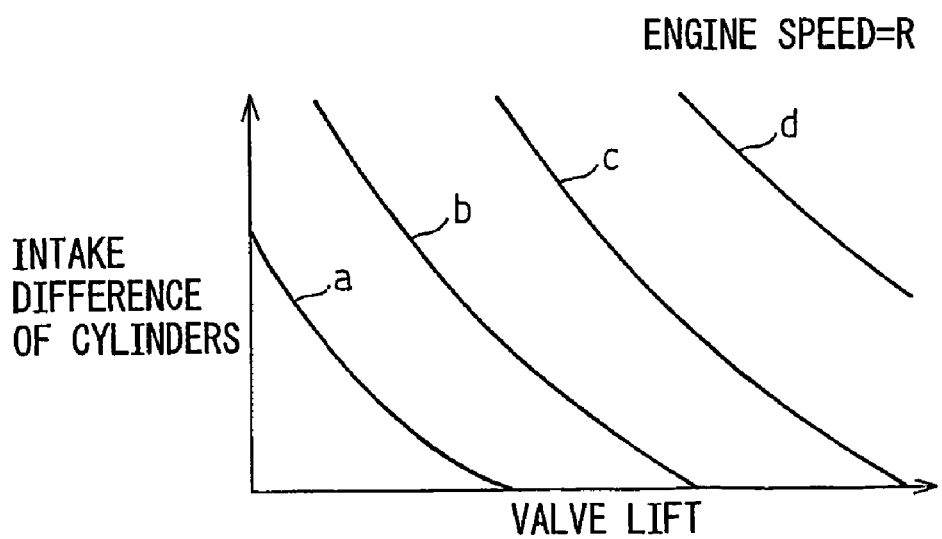
FIG. 7 is a map for determining a lower limit of a control range of valve lift used in the method shown in the flow chart of FIG. 6.

The selected map becomes for example that shown in FIG. 7. This is prepared in advance for each engine speed, but shows the lower limit of the valve lift so that the intake difference of cylinders under the envisioned operating conditions becomes within an allowable range of the intake difference corresponding to the allowable range of torque fluctuation and exhaust emission. The map shown in FIG. 7 is one with an engine speed when estimating the intake difference of cylinders of "R". The abscissa shows the valve lift when estimating the intake difference of cylinders, while the ordinate shows the intake difference of the cylinders estimated at step 201. The curves a, b, c, and d connect the points giving the lower limits of the valve lift. The lower limit of valve lift of the curve a is the smallest, while b, c, and d become gradually larger. That is, in the map shown in FIG. 7 the lower limit of the control range of the valve lift is set so as to become larger the larger the intake difference estimated when the valve lift is the same and is set so as to become larger for the same intake difference the larger the valve lift when estimating the intake difference. This is because the smaller the valve lift, the easier the intake difference of cylinders arises. By suitably preparing such a map, the limit on the control range of the valve lift for keeping the intake difference among the cylinders in the allowable range can be suitably determined.

After the map is selected at step 203, the routine proceeds to step 205, where the lower limit of the valve lift is determined based on the map selected at step 203. Further, after the lower limit of the valve lift is determined at step 205, the control range of the valve lift is limited to at least the lower limit in the subsequent control of the intake. Note that as explained above, even if the control range of the valve lift is limited, the intake can be controlled without problem by co-control with control of the intake pressure by the throttle valve 56.

In this way, according to this method, the limit on the control range of the valve lift is determined considering the estimated intake difference and the engine speed and valve lift at the time of estimating the intake difference, so it is possible to determine the limit on the control range accurately reflecting the significance of the intake difference (that is, the extent of abnormality indicated by the intake) without regard as to the engine speed or valve lift when estimating the intake difference. That is, according to this method, it is possible to estimate the intake difference and determine the limit of the control range at the time of any engine speed and any valve lift. Note that in another embodiment, it is also possible to specify either of the engine speed and valve lift at the time of estimating the intake difference of cylinders so as to try to reduce the number of maps used.

Further, with this method as well, it is possible to limit the control range of the valve lift in accordance with the actually occurring intake difference of cylinders, that is, the extent of torque fluctuation and exhaust emission due to the same. Due to this, no deterioration of the exhaust emission is invited, the effect due to control of the valve operating characteristics to control the intake can be maintained as much as possible, torque fluctuation occurring due to the intake difference of cylinders can be suppressed, and deterioration of the exhaust emission due to the intake difference of cylinders can be reduced. Further, this method also reduces the torque fluctuations by limiting the control range of the valve lift in the same way as the method explained with reference to FIG. 4. Therefore, it is possible to easily and reliably reduce the torque fluctuation compared with the case of reducing the torque fluctuation by correcting the fuel injection amounts and ignition timings for the individual cylinders.

Next, another embodiment of the present invention will be explained. This embodiment has a large number of parts common with the embodiment explained above. The explanations of common parts will in principle be omitted. This embodiment can be configured as shown in FIG. 1 and FIG. 2. In this embodiment, the control range of a valve operating characteristic in the above other embodiments is limited by correcting the target valve operating characteristic by exactly a predetermined correction amount when controlling the valve operating characteristic.

That is, taking as an example the valve lift as the valve operating characteristic, in this embodiment, when there is an intake difference of cylinders, the target valve lift is corrected so as to become larger by exactly a predetermined amount. Further, due to this, the valve lift is controlled to a larger valve lift than usual, so it is possible to obtain substantially the same effects as when changing the lower limit of the control range to become larger in the above other embodiments. That is, no deterioration of the exhaust emission is invited, the torque fluctuation occurring due to the intake difference of cylinders is suppressed, and a reduction in the deterioration of exhaust emission due to the intake difference of cylinders can be achieved.

Below, this embodiment will be explained in more detail. Note that here too, the explanation will be given using the valve lift as the valve operating characteristic, but in this embodiment as well, there is a constant relationship between the valve lift and the operating angle and the same thinking is possible for the operating angle as well.

Figure 8:
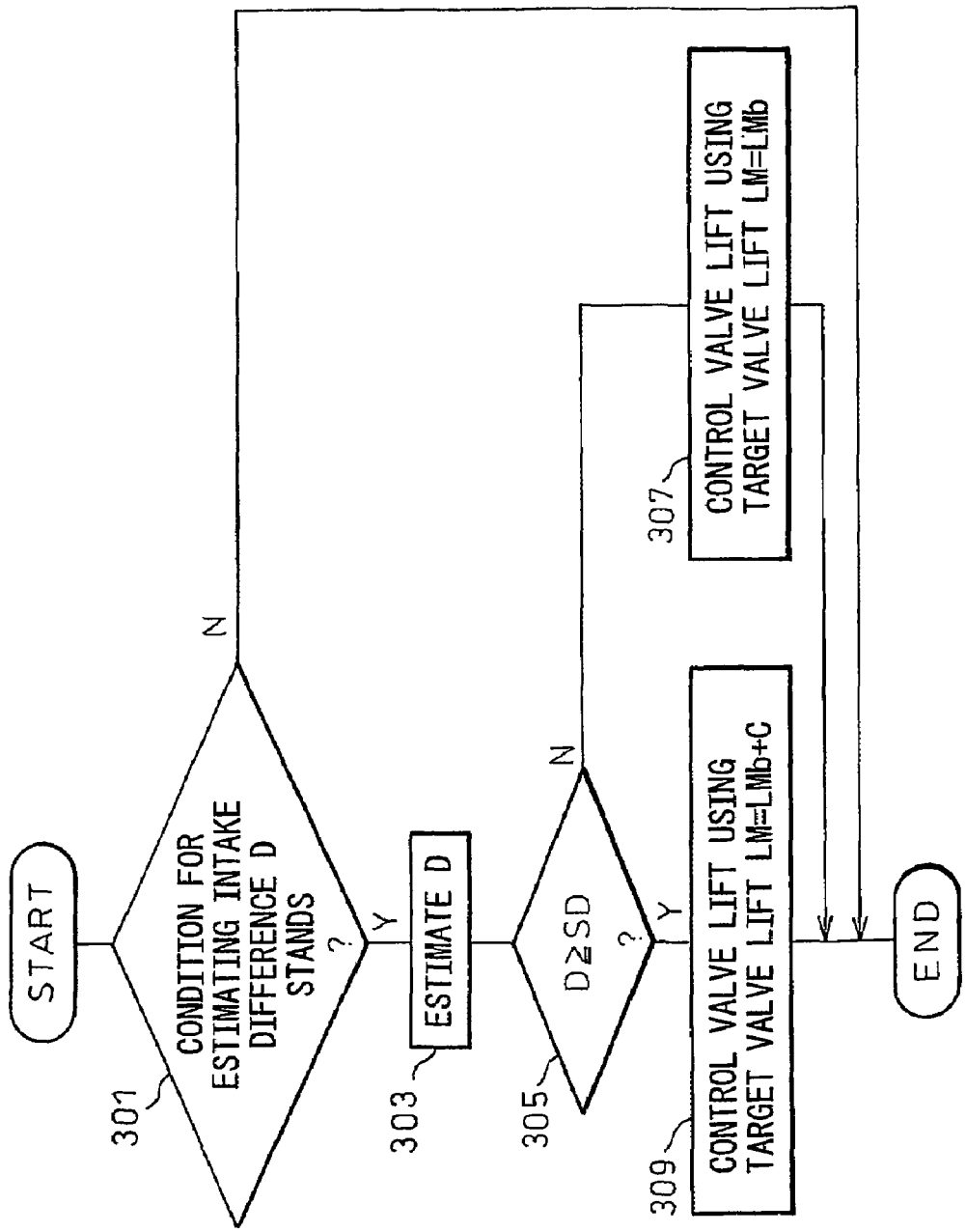
FIG. 8 is a flow chart for explaining the method of control of the valve lift in an embodiment of the present invention.

FIG. 8 is a flow chart for explaining the method of control of the valve lift in the present embodiment. The control routine shown in this flow chart is executed by the ECU 22 by interruption every certain time interval. When this control routine starts, first, at step 301, it is judged if the condition for estimating the intake difference D of cylinders stands. When it is judged that the above condition does not stand, the control routine ends, while when it is judged that the condition stands, the routine proceeds to step 303, where the intake difference D of cylinders is estimated. The contents of the control at steps 301 and 303 are similar to the contents of control of steps 101 and 103 of the control routine of FIG. 4.

After the intake difference D of cylinders is found at step 303, the routine proceeds to step 305. At step 305, the intake difference D found at step 303 is compared with a predetermined standard intake difference SD. Further, if the intake difference D is less than the above standard intake difference SD, it is judged that the intake difference of cylinders is in the allowable range and there is no variation, then the routine proceeds to step 307. On the other hand, when the intake difference D is the standard intake difference SD or higher, it is judged that the intake difference among the cylinders is not within the allowable range and there is variation, then the routine proceeds to step 309.

Here, the standard intake difference SD is preset as the standard value for judging if the intake difference of cylinders of the internal combustion engine is within the allowable range (that is, presence of variation) including cases of other operating conditions by comparing with the intake difference D of cylinders estimated when the condition for estimation of the intake difference of step 301 stands. This standard intake difference SD differs in value if the conditions for estimating the intake difference differ. For example, the larger the valve lift of the condition for estimating the intake difference, the larger the value tends to be.

When it is judged at step 305 that there is no variation in the intake difference of cylinders, the routine proceeds to step 307. In this case, the target valve lift LM is not corrected. That is, in this case, as usual, the valve lift is controlled using as it is the target valve lift LMb found from the operating state of the engine.

On the other hand, when it is judged at step 305 that there is variation in the intake difference of cylinders, the routine proceeds to step 309. In this case, the usually found target valve lift LMb is corrected based on the operating state of the internal combustion engine. The target valve lift after correction is used to control the valve lift. That is, here, the usual target valve lift LMb is given a constant correction amount C to correct the target valve lift LM. That is, due to this, the target valve lift is corrected to become larger by exactly the correction amount C. As a result, the valve lift is controlled by a valve lift larger than usual and an effect can be obtained substantially the same as when changing the lower limit of the control limit to become larger in the above embodiments. Note that in this case, the upper limit of the target valve lift LM may be predetermined. When the original target valve lift LMb is large and addition of the correction amount C will result in the upper limit ending up being exceeded, it is preferable that the target valve lift LM be set to become the upper limit.

Figure 9:
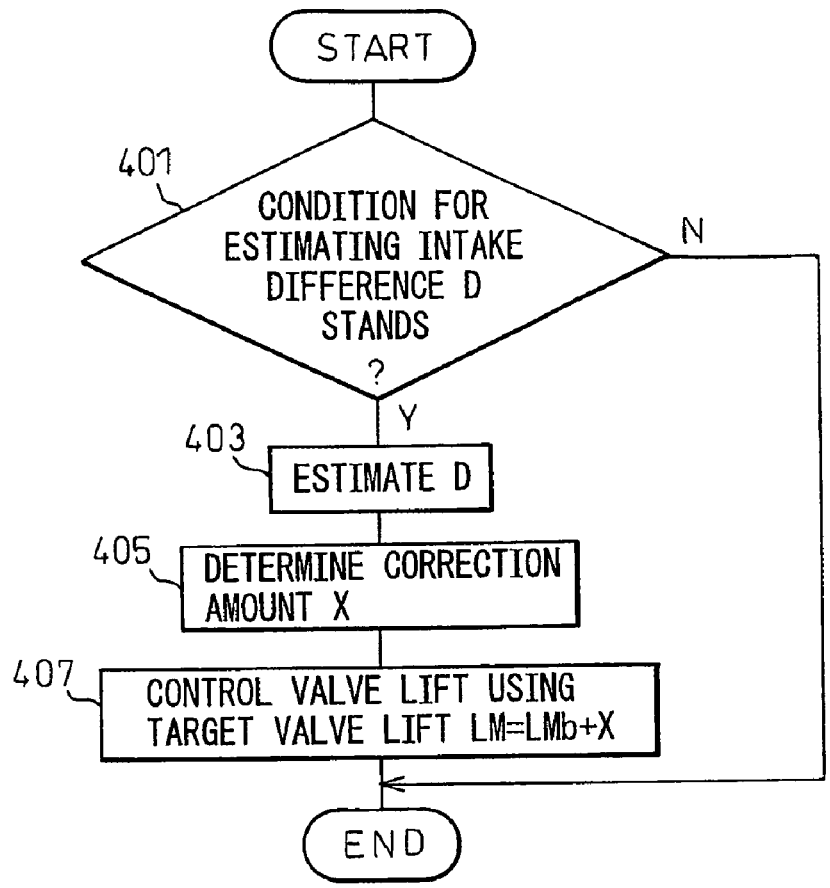
FIG. 9 is a flow chart for explaining another method of control of the valve lift.

Next, another method for control of the valve lift will be explained. FIG. 9 is a flow chart for explaining this method. The control routine shown in this flow chart is executed by interruption every certain time interval by the ECU 22. When this control routine starts, the routine proceeds to steps 401 and 403. The contents of the control at steps 401 and 403 of this control routine are similar to the contents of control of steps 101 and 103 of the control routine of FIG. 4 or steps 301 and 303 of the control routine of FIG. 8, so the explanations will be omitted here.

Figure 10:
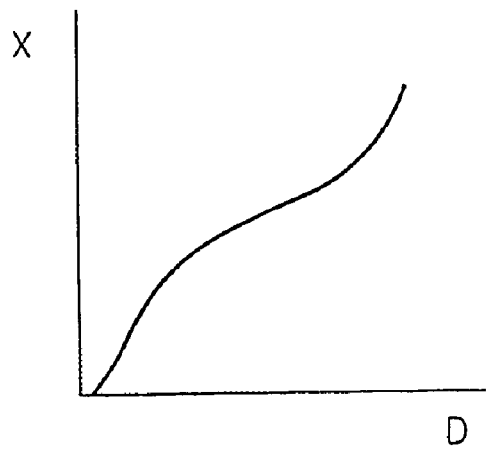
FIG. 10 is a map for determining a correction amount X used in the method explained using the flow chart of FIG. 9.

In this control routine, after the intake difference D among the cylinders is found at step 403, the routine proceeds to step 405, where the correction value X for the target valve lift LM is determined in accordance with the intake difference D. That is, for determining the correction amount X, the map shown in FIG. 10 for example is used. The map of FIG. 10 links the intake difference D of cylinders estimated in the case where the condition for estimating the intake difference stands at step 401 and the correction amount X suitable for when the intake difference D of cylinders is found and is prepared in advance. In the example of FIG. 10, the correction amount X is made larger the larger the intake difference D of cylinders found. Further, a different map is used if the condition for estimating the intake difference differs.

After the correction amount X is determined at step 405, the routine proceeds to step 407, where the target valve lift obtained by correcting the target valve lift LMb normally found from the operating state of the internal combustion engine by exactly the correction amount X (target valve lift after correction) is used to control the valve lift. That is, in this case, by adding the correction amount X found at step 405 to the usual target valve lift LMb, the target valve lift LM is corrected. Due to this, the target valve lift LM is corrected to become larger by exactly the correction amount X. As a result, the valve lift is controlled by a valve lift larger than normal, whereby substantially the same effect can be obtained as when changing the lower limit of the control range to become larger in the above-mentioned embodiments. Further, with this method, the magnitude of the correction amount X is determined by the magnitude of the intake difference D of cylinders, so it is possible to maintain the effect due to control of the valve operating characteristics to control the intake as much as possible. Note that in this case as well, the upper limit of the target valve lift LM may be predetermined. When the original target valve lift LMb is large and addition of the correction amount X would result in the upper limit being exceeded, it is preferable that the target valve lift LM be the upper limit.

Figure 11:
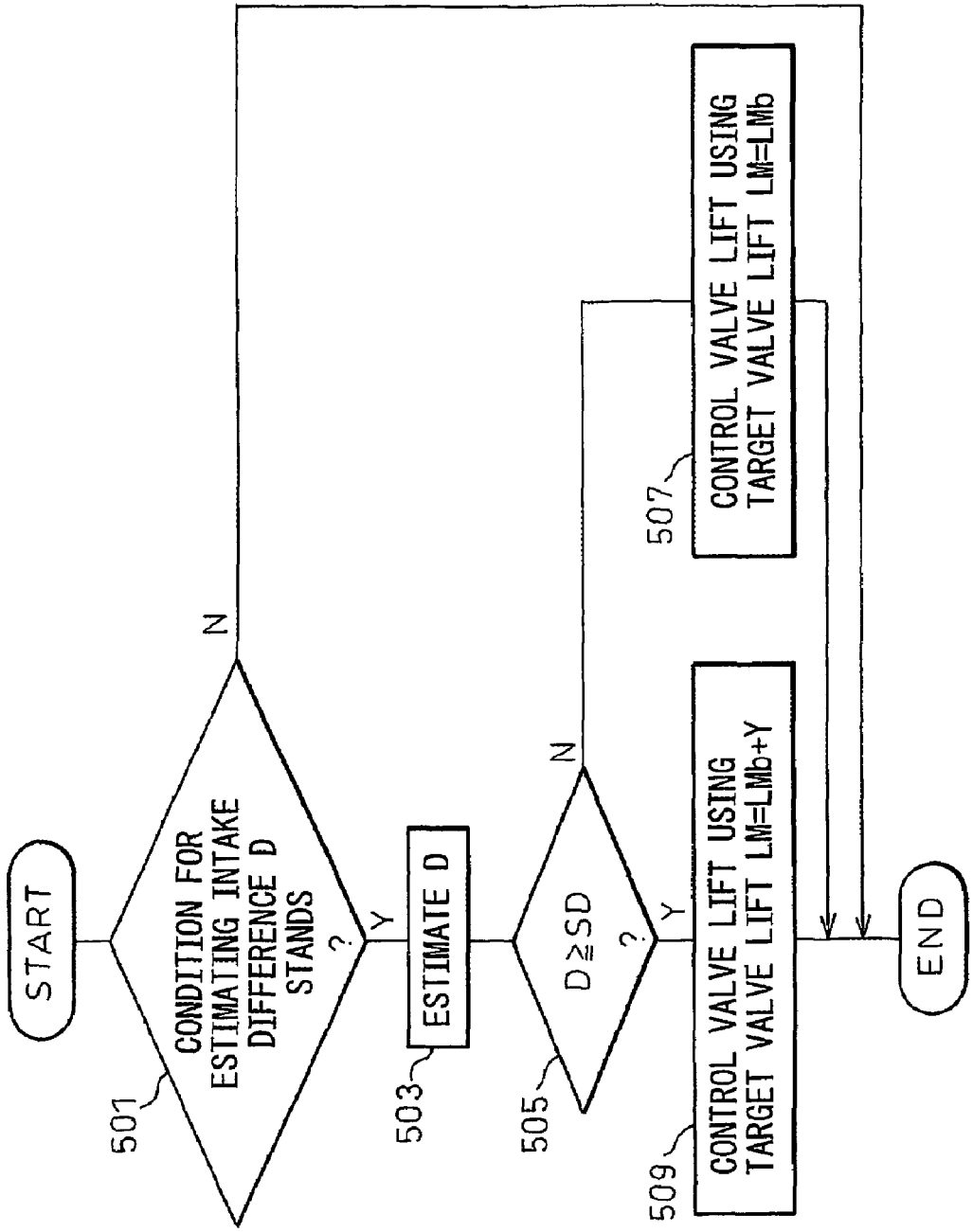
FIG. 11 is a flow chart for explaining still another method of control of the valve lift.

Next, still another method of control of the valve lift will be explained. FIG. 11 is a flow chart for explaining this method. The control routine shown in this flow chart is executed by the ECU 22 by interruption every certain time interval. This control routine is basically the same as the control routine of FIG. 8. That is, the contents of the control at steps 501, 503, 505, and 507 of this control routine are similar to the contents of control of steps 301, 303, 305, and 307 of the control routine of FIG. 8, so the explanations will be omitted here.

In this control routine as well, when it is judged at step 505 corresponding to step 305 that the intake difference D of cylinders is at least the standard intake difference SD, that is, it is judged that the intake difference D is not in the allowable range and there is variation, the routine proceeds to step 509 corresponding to step 309, wherein the target valve lift LMb normally found from the operating state of the internal combustion engine is corrected and the target valve lift after correction is used to control the valve lift. In this method, however, the correction amount Y used for the correction is determined in accordance with the target valve lift LMb before correction.

Figure 12:
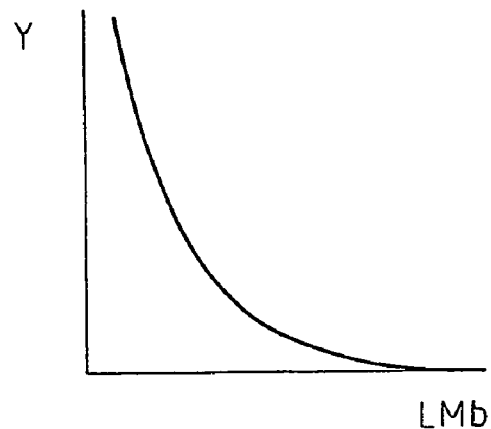
FIG. 12 is a map for determining a correction amount Y used in the method explained using the flow chart of FIG. 11.

That is, this correction amount Y is determined for example using the map such as shown in FIG. 12. The map of FIG. 12 links the target valve lift LMb normally found from the operating state of the internal combustion engine (that is, the target valve lift before correction) and the correction amount Y suitable for the target valve lift LMb before correction and is prepared in advance. In the example of FIG. 12, the correction amount Y is made smaller the larger the target valve lift LMb before correction. This is because when the valve lift is relatively large, even if the intake difference is large, the influence of the assembly tolerance or mechanical tolerance relating to the valve parts or the wear or deposit of the valve parts upon the intake difference can be deemed be small. By doing this, it becomes possible to keep the control range of the valve operating characteristics from being limited more than necessary.

As clear from the above explanation, in this method, when the routine proceeds to step 509, where the target valve lift LM is corrected and the valve lift controlled, at the time of control of the valve lift, the usual target valve lift LMb is found from the operating state of the internal combustion engine, then the correction amount Y for the target valve lift LMb is found based on a map, such as FIG. 12 and the target valve lift LM is corrected by adding this correction amount Y to the original target valve lift LMb. Further, this target valve lift after correction is used to control the valve lift.

By doing this, it is possible to control the valve lift to a valve lift larger than usual and possible to obtain substantially the same effects as when changing the lower limit of the control range to become larger in the above embodiments. Further, with this method, the magnitude of the correction amount Y is determined by the target valve lift LMb before correction, so it is possible, by suitably setting the map for finding the correction amount Y, to keep from limiting the control range of the valve lift more than necessary and to maintain the effect due to control of the valve operating characteristics to control the intake as much as possible.

Figure 13:
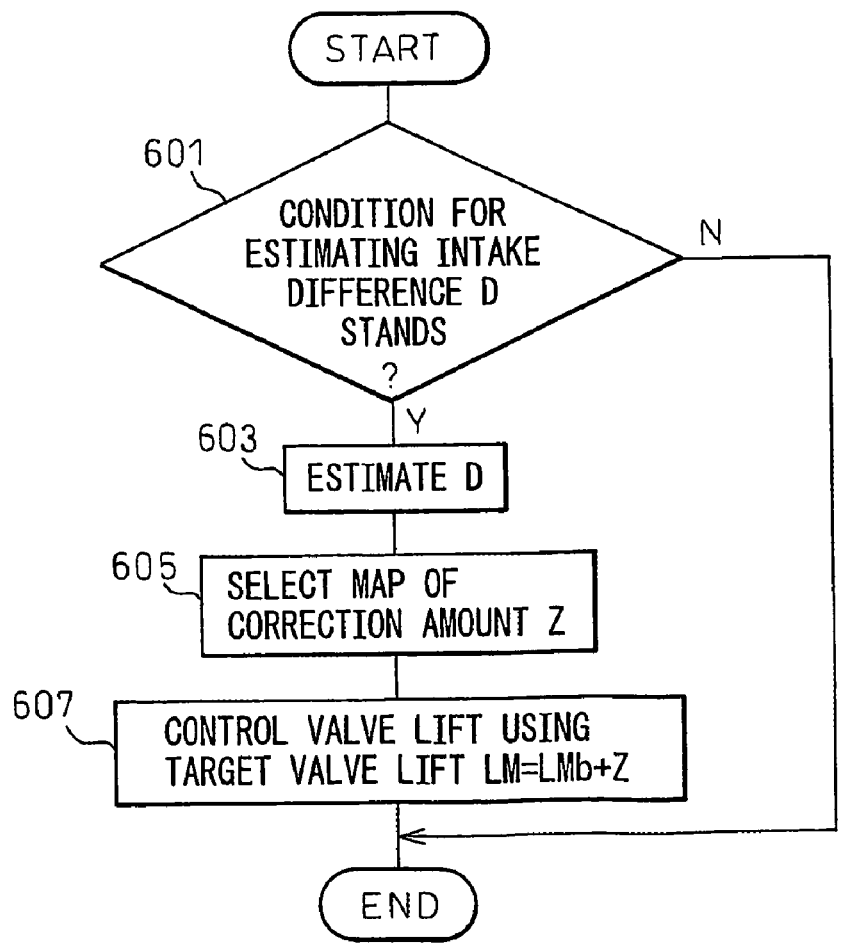
FIG. 13 is a flow chart for explaining still another method of control of the valve lift.

Next, still another method of control of the valve lift will be explained. FIG. 13 is a flow chart for explaining this method. The control routine shown in this flow chart is executed by the ECU 22 by interruption every certain time interval. This control routine is basically the same as the control routine of FIG. 9. That is, the contents of the control at steps 601 and 603 of this control routine are similar to the contents of control of steps 401 and 403 of the control routine of FIG. 9, so the explanations will be omitted here.

Figure 14:
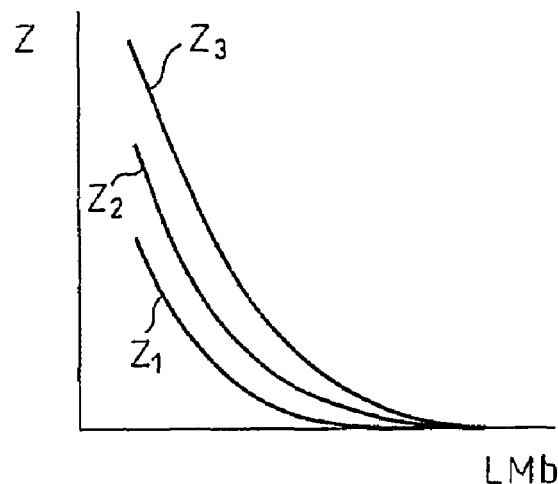
FIG. 14 is a map for determining a correction amount Z used in the method explained using the flow chart of FIG. 13.

In this control routine as well, after finding the intake difference D of cylinders at step 603 corresponding to step 403, the routine proceeds to step 605, wherein a map for finding the correction amount Z for the target valve lift LM is selected. That is, with this method, the maps such as shown by Z1, Z2, and Z3 in FIG. 14 are prepared in advance. At step 605, one map is selected from this plurality of maps in accordance with the intake difference D.

Each map shown in FIG. 14 is basically the same as the map shown in FIG. 12 and links the target valve lift LMb normally found from the operating state of the internal combustion engine and the correction amount Z suitable for the target valve lift LMb before correction. Further, the maps provide correction amounts Z suitable for estimation of intake differences D larger in the order of Z1, Z2, and Z3. Therefore, in the example of the maps shown in FIG. 14, the larger the intake difference D estimated at step 603, the further to the Z3 side the map is selected. Note that here the explanation was made taking as an example the case of selecting a map from the three maps Z1 to Z3, but it is also possible to use two or four or more maps. Whatever the case, the larger the intake difference D of cylinders estimated at step 603, the larger the correction amount Z of the map selected.

After the map for finding the correction amount Z is selected at step 605, the routine proceeds to step 607, where the map selected at step 605 is used to correct the target valve lift LM and control the valve lift. That is, when correcting the target valve lift LM to control the valve lift in this method, when controlling the valve lift, the usual target valve lift LMb is found from the operating state of the internal combustion engine etc., then the correction amount Z for that target valve lift LMb is found based on the map selected at step 605 and the correction amount Z is added to the original target valve lift LMb to correct the target valve lift LM. The target valve lift after correction is used to control the valve lift.

By doing this, it is possible to control the valve lift to a valve lift larger than usual and it is possible to obtain substantially the same effects as when changing the lower limit of the control range to become larger in the above embodiments. Further, with this method, the magnitude of the correction amount Z is determined in accordance with the intake difference D of cylinders and the target valve lift LMb before correction, so it is possible to keep from limiting the control range of the valve lift more than necessary and to maintain the effect due to control of the valve operating characteristics to control the intake as much as possible.

Note that in the above embodiments, the valve lift changing device 9 was provided at only the intake valve 2 side, but in another embodiment, the valve lift changing device may also be provided at the exhaust valve 3 side or may be provided at both of the intake valve 2 side and the exhaust valve 3 side. Further, in this case, it is considered that, even for an exhaust valve, if the operating angle or valve lift becomes smaller, the residual exhaust gas in the cylinder will become greater, so the intake will fall and that the smaller the operating angle or valve lift, the easier an intake difference of cylinders will occur, so by applying similar techniques as with the intake valves of the above embodiments to exhaust values, it is considered possible to reduce the torque fluctuation more.

Further, in the above embodiments, there was a certain relationship between the valve operating characteristics of the operating angle and valve lift, but in another embodiment, it is also possible to change the operating angle and valve lift independently and to change either just the operating angle or the valve lift.

Figure 15:
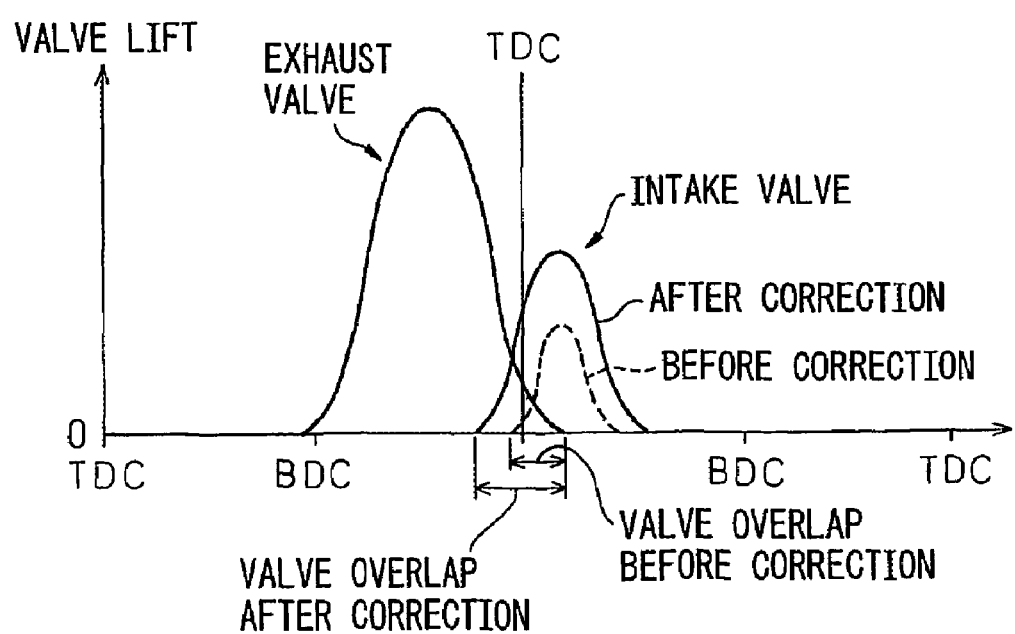
FIG. 15 is a view of the state of change of the length etc. of overlap by correcting the valve lift of the intake valve.

If however the valve lift (and/or operating angle) is corrected to become larger for the purpose of reducing the torque fluctuation as in the above embodiments, the length of the period during which both the intake valve and the exhaust valve are open (valve overlap) will become longer in some cases (see FIG. 15). Further, if the length of the valve overlap becomes greater in this way, even if the intake (fresh air taken into the combustion chamber) is controlled to the target intake by co-control of the valve lift (and/or operating angle) and intake pressure, the amount of burnt gas remaining in the combustion chamber (amount of internal EGR gas) will increase, combustion will deteriorate, and worse torque fluctuation and misfires will occur in some cases. Further, the timing of the valve overlap may be considered to also change along with correction of the valve lift (and/or operating angle). In this case, in addition to the worse torque fluctuations or misfires due to the increase in the residual burnt gas, the fuel efficiency will deteriorate due to the reduction in the amount of the residual burnt gas in some cases.

Therefore, next, an embodiment designed to keep this problem from occurring will be explained. Note that here too, the explanation will be made using the valve lift as the valve operating characteristic, but in the embodiment explained below as well, there is a certain relationship between the valve lift and the operating angle and the operating angle can be considered in the same way.

Figure 16:
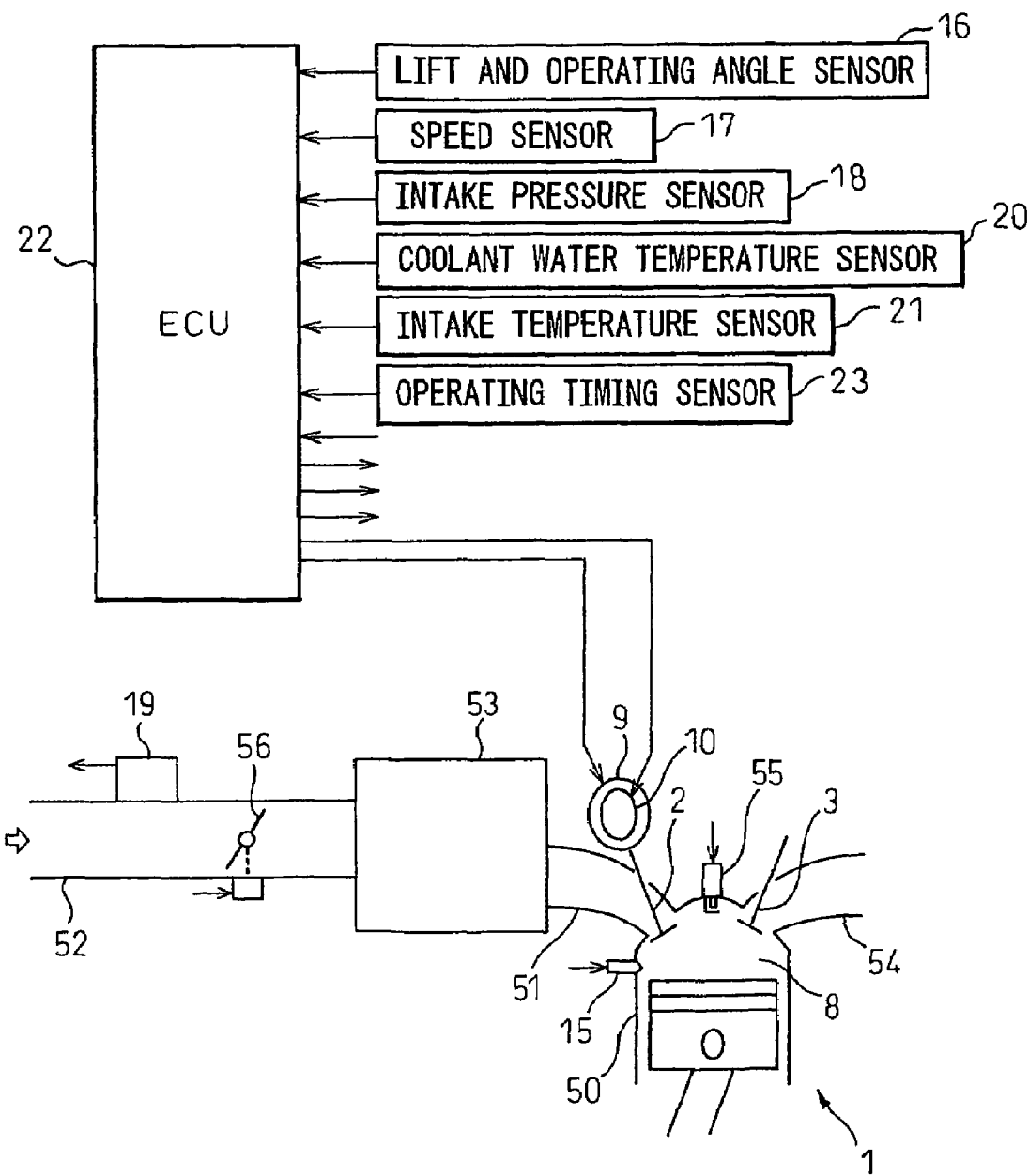
FIG. 16 is a view of the general configuration of another embodiment of a control device for an internal combustion engine according to the present invention.

FIG. 16 is a view of the general configuration of this embodiment. The configuration of FIG. 16 is basically the same as the configuration shown in FIG. 1. Explanations of common parts will in principle be omitted. Comparing the configuration shown in FIG. 16 with the configuration shown in FIG. 1, the configuration of FIG. 16 differs in the point of provision of the operating timing changing device 10 for changing the operating timing (the opening timing) at the intake valve 2. Further, the configuration of FIG. 16 is also provided with an operating timing sensor 23 for detecting the operating timing of the intake valve 2.

By adopting such a configuration, in the present embodiment, it is possible to change the valve lift of the intake valve 2 and to change the operating timing as well. Further, using this fact, in the present embodiment, the length and timing of the valve overlap in the case of correction of the valve lift are made to approach or match with the length and timing of the valve overlap before correction of the valve lift.

More specifically, when the correction amount of the target valve lift is determined, an operating timing whereby the length and timing of the valve overlap in the case of the target valve lift after correction will approach or match with the length and timing of the valve overlap in the case of the target valve lift before correction is found in accordance with the correction amount (or the target valve lift after correction) and the operating timing is changed to the found operating timing at the same time as controlling the valve lift correcting the target valve lift.

Figure 17:
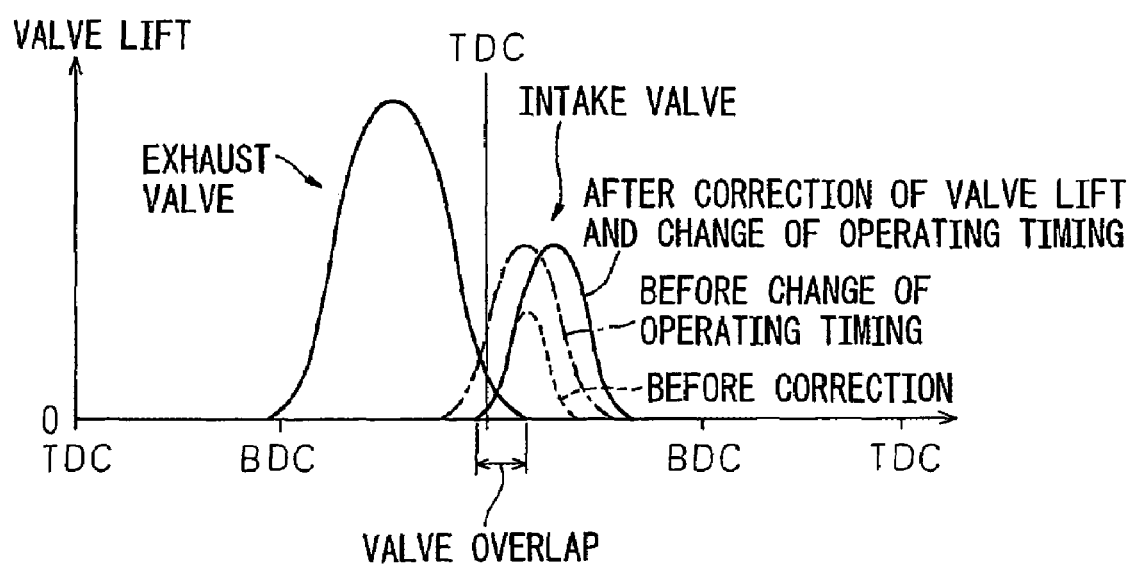
FIG. 17 is a view of the correction of the valve lift of the intake valve and the change of the operating timing in an embodiment having the configuration shown in FIG. 16.

FIG. 17 shows an example of the case of correcting the valve lift and changing the operating timing. In the example shown in FIG. 17, the operating timing is delayed at the same time as correction of the valve lift of the intake valve 2 and the length and timing of the valve overlap in the case of the valve lift after correction are made to match with the length and timing of the valve overlap in the case of the valve lift before correction.

As clear from this example as well, as in the present embodiment, when the valve lift and operating timing of an exhaust valve 3 are fixed, by suitably setting the operating timing of the intake valve 2, it is possible to make both the length and timing of the valve overlap in the case of the valve lift after correction match the length and timing of the valve overlap in the case of the valve lift before correction.

Further, by doing this, it is possible to suppress the occurrence of trouble explained above (worse torque fluctuation etc.) liable to arise when correcting the target valve lift to control the valve lift and thereby changing the length and timing of the valve overlap and changing the amount of the residual burnt gas.

Note that above, the explanation was made of the case of providing the operating timing changing device 10 at the intake valve 2, but even when providing the operating timing changing device at the exhaust valve 3, by suitably setting the operating timing of the exhaust valve 3, it is possible to make the length of the valve overlap in the case of correction of the valve lift of the intake valve 2 match with that before correction of the valve lift. In this case as well, it is possible to suppress worse torque fluctuation etc. liable to arise when correcting the target valve lift to control the valve lift and thereby changing the length of the valve overlap and changing the amount of the residual burnt gas.

Further, in another embodiment, it is possible to make the length of the valve overlap when correcting the valve lift shorter than the length of the valve overlap before correction of the valve lift so as to more reliably suppress trouble such as torque fluctuation able to occur due to the amount of residual burnt gas changing due to correction of the target valve lift to control the valve lift.

That is, when controlling the intake (fresh air taken into the combustion chamber) by co-control of the valve operating characteristic of the valve lift and the intake pressure, if the target valve lift is corrected to become larger when controlling the valve lift, to maintain the same target intake, it is necessary to for example control the throttle valve to the closed side etc. so as to reduce the intake pressure. By reducing the intake pressure in this way, due to this effect, even if the length of the valve overlap is made the same as the length of the valve overlap before correction of the valve lift, the amount of residual burnt gas is liable to increase. That is, the burnt gas is liable to remain in the combustion chamber by the amount of reduction of the intake pressure.

Therefore, in this case, it is preferable to make the length of the valve overlap in the case of correction of the valve lift shorter than the length of valve overlap before correction of the valve lift so as to keep the amount of residual burnt gas from increasing due to a drop in the intake pressure.

More specifically, when the correction amount of the target valve lift is determined, the operating timing whereby the length of the valve overlap in the case of the target valve lift after correction becomes shorter than the length of the valve overlap in the case of the target valve lift before correction is found in accordance with the correction amount (or target valve lift after correction) and the operating timing is changed to the found operating timing at the same time as controlling the valve lift by the corrected target valve lift.

By doing this, it is possible to keep the amount of residual burnt gas from increasing due to the drop in the intake pressure, so it is possible to make the intake the target intake and more reliably suppress trouble such as torque fluctuation able to occur due to the amount of residual burnt gas changing due to correction of the target valve lift to control the valve lift.

Further, in this case, preferably the extent of shortening the length of the overlap is set in accordance with the magnitude of the change in intake pressure (drop in intake pressure) required for controlling the intake due to correcting the target valve lift to control the valve lift. This is because the extent by which the burnt gas easily remains in the combustion chamber is determined by the magnitude of the change in intake pressure (drop in intake pressure) required for controlling the intake due to correcting the target valve lift to control the valve lift.

Therefore, by doing this, it is possible to make the amount of residual burnt gas in the case of controlling the valve lift while correcting the target valve lift approach or match the amount of residual burnt gas in the case of control of the valve lift without correcting the target valve lift. Further, due to this, it is possible to more reliably suppress trouble such as torque fluctuation liable to occur due to correcting the target valve lift to become larger by exactly a predetermined correction amount when controlling the valve lift and possible to suppress the occurrence of trouble such as an increase in pump loss due to shortening the length of the valve overlap more than necessary.

Further, in still another embodiment, it is also possible to provide the operating timing changing device at both the intake valve 2 and exhaust valve 3. In this case, it is possible to change the length and timing of the valve overlap, so it is possible to set the length and timing of valve overlap after correction to become optimal considering the fuel efficiency and torque fluctuations, etc. along with correction of the valve lift.

That is, when the correction amounts of the valve lifts are determined, the operating timings of the intake valve 2 and exhaust valve 3 for optimizing the length and timing of valve overlap in the case that the valve lifts are corrected, considering the fuel efficiency, torque fluctuation, etc. are found in accordance with the correction amounts (or valve lifts after correction), the valve lifts are corrected, and simultaneously the operating timings are changed to the operating timings found. By doing this, improvement of the fuel efficiency and torque fluctuations can be achieved along with correction of the valve lifts.

Although the present invention has been described with reference to several embodiments thereof shown in the accompanying drawings, the embodiments are only illustrative but not limitative. The scope of the present invention should be limited by the appended claims thereof, and the present invention can be changed and modified without departing from the scope of the claims.

The invention claimed is:

1. A control device of a multicylinder internal combustion engine provided with a valve operating characteristic control means for controlling a valve operating characteristic of at least one of an intake valve and an exhaust valve, which estimates an intake difference of cylinders and limits a control range of the valve operating characteristic in accordance with the estimated intake difference, and which controls an operating angle as said valve operating characteristic and sets a lower limit of control range of the operating angle larger the larger the operating angle at the time of estimating the intake difference.

2. A control device of a multicylinder internal combustion engine provided with a valve operating characteristic control means for controlling a valve operating characteristic of at least one of an intake valve and an exhaust valve, which estimates an intake difference of cylinders and limits a control range of the valve operating characteristic in accordance with the estimated intake difference, and which controls a valve lift as said valve operating characteristic and sets a lower limit of control range of the valve lift larger the larger the valve lift at the time of estimating the intake difference.

3. A control device of a multicylinder internal combustion engine provided with a valve operating characteristic control means for controlling a valve operating characteristic of at least one of an intake valve and an exhaust valve, which estimates an intake difference of cylinders and limits a control range of the valve operating characteristic in accordance with the estimated intake difference, and which controls an operating angle and/or valve lift as said valve operating characteristic and sets a lower limit of control range of the operating angle and/or valve lift larger the larger the intake difference estimated.

4. A control device of a multicylinder internal combustion engine provided with a valve operating characteristic control means for controlling a valve operating characteristic of at least one of an intake valve and an exhaust valve, which estimates an intake difference of cylinders and limits a control range of the valve operating characteristic in accordance with the estimated intake difference, and which controls an operating angle and/or valve lift as said valve operating characteristic, limits a control range of the valve operating characteristic by correcting a target operating angle and/or target valve lift to become larger by exactly a predetermined correction amount when controlling the operating angle and/or valve lift, and sets said predetermined correction amount to become smaller the larger the target operating angle and/or target valve lift before correction.

5. A control device of a multicylinder internal combustion engine as set forth in claim 4, wherein said predetermined correction amount is set so as to become larger the larger the estimated intake difference.

6. A control device of a multicylinder internal combustion engine provided with a valve operating characteristic control means for controlling a valve operating characteristic of at least one of an intake valve and an exhaust valve, which estimates an intake difference of cylinders and limits a control range of the valve operating characteristic in accordance with the estimated intake difference, and which device is further provided with an operating timing changing means for changing an operating timing of at least one of the intake valve and exhaust valve, controls an operating angle and/or valve lift as said valve operating characteristic, limits a control range of the valve operating characteristic by correcting a target operating angle and/or target valve lift to become larger by exactly a predetermined correction amount when controlling the operating angle and/or valve lift, and changes the operating timing of at least one of the intake valve and exhaust valve so that a length of a period in which the intake valve and exhaust valve are both open in the case of the target operating angle and/or target valve lift after correction approaches or matches a length of a period in which the intake valve and exhaust valve are both open in the case of the target operating angle and/or target valve lift before correction.

7. A control device of a multicylinder internal combustion engine as set forth in claim 6, which changes the operating timing of at least one of the intake valve and exhaust valve so that a timing of a period in which the intake valve and exhaust valve are both open in the case of the target operating angle and/or target valve lift after correction approaches or matches a timing of a period in which the intake valve and exhaust valve are both open in the case of the target operating angle and/or target valve lift before correction.

8. A control device of a multicylinder internal combustion engine provided with a valve operating characteristic control means for controlling a valve operating characteristic of at least one of an intake valve and an exhaust valve, which estimates an intake difference of cylinders and limits a control range of the valve operating characteristic in accordance with the estimated intake difference, and which device is further provided with an operating timing changing means for changing an operating timing of at least one of the intake valve and exhaust valve, controls an operating angle and/or valve lift as said valve operating characteristic, limits a control range of the valve operating characteristic by correcting a target operating angle and/or target valve lift to become larger by exactly a predetermined correction amount when controlling the operating angle and/or valve lift, and changes the operating timing of at least one of the intake valve and exhaust valve so that a length of a period in which the intake valve and exhaust valve are both pen in the case of the target operating angle and/or target valve lift after correction becomes shorter than a length of a period in which the intake valve and exhaust valve are both open in the case of the target operating angle and/or target valve lift before correction.

9. A control device of a multicylinder internal combustion engine as set forth in claim 8, wherein an extent of shortening the length of the period where the intake valve and exhaust valve are both open is set in accordance with a magnitude of change of intake pressure required for control of the intake due to correcting said target operating angle and/or target valve lift to control said operating angle and/or valve lift.

10. A control device of a multicylinder internal combustion provided with a valve operating characteristic control means for controlling a valve operating characteristic of at least one of an intake valve and an exhaust valve, which estimates an intake difference of cylinders and limits a control range of the valve operating characteristic in accordance with the estimated intake difference, wherein the intake difference of cylinders is estimated based on the intake detected by an intake detecting means provided at an upstream side from an intake passage branching to an individual cylinder and wherein the intake detecting means detects the intake at the time of a valve operating characteristic by which the timings of opening of the intake valves of the plurality of cylinders do not overlap.

11. A control device of a multicylinder internal combustion engine as set forth in claim 10, wherein said intake detecting means includes an intake pressure sensor.

* * * * *

UNITED STATES PATENT AND TRADEMARK OFFICE
CERTIFICATE OF CORRECTION

PATENT NO. : 7,363,889 B2  Page 1 of 1
APPLICATION NO. : 10/521556
DATED : April 29, 2008
INVENTOR(S) : Takashi Tsunooka et al.

It is certified that error appears in the above-identified patent and that said Letters Patent is hereby corrected as shown below:

| Column | Line | |
|---|---|---|
| 3 | 40 | Change "engines" to --engine's--. |
| 6 | 46 | After "even if" delete "the". |
| 7 | 37 | Change "characteristics" to --characteristic--. |
| 17 | 32 | After "deemed" insert --to--. |
| 22 | 27 | Change "A control device" to --The control device--. |
| 22 | 54 | Change "A control device" to --The control device--. |
| 23 | 20 | Change "A control device" to --The control device--. |
| 24 | 5 | Before "provided" insert --engine--. |
| 24 | 20 | Change "A control device" to --The control device--. |

Signed and Sealed this

Fifteenth Day of December, 2009

David J. Kappos
*Director of the United States Patent and Trademark Office*